(12) United States Patent
Kochar et al.

(10) Patent No.: US 9,152,584 B2
(45) Date of Patent: Oct. 6, 2015

(54) PROVIDING BUS RESILIENCY IN A HYBRID MEMORY SYSTEM

(71) Applicant: LENOVO ENTERPRISE SOLUTIONS (SINGAPORE) PTE. LTD., Singapore (SG)

(72) Inventors: Sumeet Kochar, Apex, NC (US); Makoto Ono, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 155 days.

(21) Appl. No.: 14/065,601

(22) Filed: Oct. 29, 2013

(65) Prior Publication Data

US 2015/0121125 A1    Apr. 30, 2015

(51) Int. Cl.
| G06F 11/00 | (2006.01) |
| G06F 13/16 | (2006.01) |
| G06F 11/07 | (2006.01) |
| G06F 11/26 | (2006.01) |

(52) U.S. Cl.
CPC ........ *G06F 13/1668* (2013.01); *G06F 11/0772* (2013.01); *G06F 11/261* (2013.01)

(58) Field of Classification Search
CPC ............ G06F 11/0772; G06F 11/0793; G06F 11/1666; G06F 11/2056; G06F 11/2069; G06F 11/2094; G06F 11/2205; G06F 11/2284; G06F 11/261; G06F 13/1668
See application file for complete search history.

(56) References Cited

U.S. PATENT DOCUMENTS

| 6,970,968 | B1 * | 11/2005 | Holman | 711/5 |
| 8,397,013 | B1 * | 3/2013 | Rosenband et al. | 711/103 |
| 8,607,089 | B2 * | 12/2013 | Qawami et al. | 713/400 |
| 2005/0204091 | A1 * | 9/2005 | Kilbuck et al. | 711/103 |
| 2008/0082751 | A1 * | 4/2008 | Okin et al. | 711/115 |
| 2009/0164837 | A1 * | 6/2009 | Swanson et al. | 714/6 |

(Continued)

OTHER PUBLICATIONS

Intel Corporation, "RAS features of the Mission-Critical Converged Infrastructure", Technical White Paper, *Reliability, Availability, and Serviceability (RAS) features of HP Integrity Systems: Superdome 2, BL8x0c, and rx2800 i2*, Intel.com (online), [accessed Apr. 3, 2013], 17 pp., URL: http://www.intel.com/content/www/us/en/mission-critical/mission-critical-computing-itanium-9300-ras-features-of-the-mission-critical-converged-infrastructure-paper.html?wapkw=superdome.

(Continued)

*Primary Examiner* — Marc Duncan
(74) *Attorney, Agent, or Firm* — Edward J. Lenart; Katherine S. Brown; Kennedy Lenart Spraggins LLP

(57) ABSTRACT

In a hybrid memory system that includes a host memory controller and a non-volatile memory DIMM, where the DIMM is coupled to the host memory controller by a memory bus, the DIMM includes non-volatile memory, a DIMM bus adapter, and a local memory controller, the local memory controller is configured to control memory accesses within the DIMM, the DIMM bus adapter is configured to adapt the local memory controller to the bus for memory communications with the host memory controller in accordance with a bus protocol, bus resiliency may be provided by: discovering, by the DIMM bus adapter, a memory error in the DIMM; providing, by the DIMM bus adapter to the host memory controller, an indication of an error by emulating a hardware error native to the bus protocol; and performing, by the host memory controller, one or more resiliency measures responsive to the indication of the error.

9 Claims, 3 Drawing Sheets

(56) References Cited

U.S. PATENT DOCUMENTS

| | | | |
|---|---|---|---|
| 2009/0327839 | A1 | 12/2009 | Yoon et al. |
| 2012/0079312 | A1 | 3/2012 | Muthrasanallur et al. |
| 2012/0131253 | A1* | 5/2012 | McKnight et al. ............ 710/308 |
| 2012/0159045 | A1* | 6/2012 | Hinkle et al. ................. 711/103 |
| 2013/0024742 | A1 | 1/2013 | Nazarian et al. |
| 2013/0086309 | A1* | 4/2013 | Lee et al. ..................... 711/103 |
| 2014/0192583 | A1* | 7/2014 | Rajan et al. .................... 365/63 |
| 2014/0351675 | A1* | 11/2014 | Tiziani et al. ................ 714/773 |

OTHER PUBLICATIONS

Krutov, "Reliability, Availability, and Serviceability Features of the IBM eX5 Portfolio", IBM Redpaper™, May 10, 2012, 28 pp., IBM Corporation, USA.

Mitchell, et al., "IBM POWER5 Processor-based Servers: A Highly Available Design for Business-Critical Applications", Aug. 16, 2006, 44 pp., IBM Corporation, USA.

Hewlett-Packard, "PCI / PCI Express Error Recovery White Paper", Oct. 6, 2010, 11 pp., Hewlett-Packard Development Company, USA.

* cited by examiner

PROVIDING BUS RESILIENCY IN A HYBRID MEMORY SYSTEM

BACKGROUND OF THE INVENTION

1. Field of the Invention

The field of the invention is data processing, or, more specifically, methods, apparatus, and products for providing bus resiliency in a hybrid memory system.

2. Description of Related Art

In computer systems today, main memory is an important component. Traditionally, volatile DRAM (Dynamic Random Access Memory) was utilized as main memory for computer systems. Today, non-volatile memory, such as Flash memory, is also being utilized in main memory. Rather than establishing a new bus protocol to handle the Flash memory, however, the Flash memory device is typically retrofit for installation in traditional DIMM (Dual Inline Memory Module) slots for communication over DDR (Double Data Rate) and PCIe (Peripheral Component Interconnect Express) busses. Such a bus, however, typically operates in a protocol not native to that of a memory controller on the Flash device. To retrofit the Flash device to operate on the non-native bus, the Flash device includes a bus adapter that effectively translates between the bus protocol and the format in which the Flash's memory control operates.

Bus resiliency features controlled by the hardware effecting the traditional bus protocols, however, are not utilized with the Flash memory because the Flash memory does not produce any errors native to the bus. Instead, in prior art systems, a software module administers the Flash memory, periodically determining whether errors exist in the Flash memory. In other embodiments, out-of-band hardware modules, such as SMBus (System Management Bus) modules, administer such error conditions. In either case, bus resiliency with respect to the Flash memory is inefficient.

SUMMARY OF THE INVENTION

Methods of providing bus resiliency in a hybrid memory system and the systems themselves are described in this specification. Such a hybrid memory system may include a host memory controller and a non-volatile memory DIMM (Dual Inline Memory Module). The DIMM may be coupled to the host memory controller by a memory bus. The DIMM may include non-volatile memory, a DIMM bus adapter, and a local memory controller. The local memory controller may be configured to control memory accesses within the DIMM and the DIMM bus adapter may be configured to adapt the local memory controller to the bus for memory communications with the host memory controller in accordance with a bus protocol. Providing bus resiliency in such a system may include: discovering, by the DIMM bus adapter, a memory error in the DIMM; providing, by the DIMM bus adapter to the host memory controller, an indication of an error by emulating a hardware error native to the bus protocol; and performing, by the host memory controller, one or more resiliency measures responsive to the indication of the error.

Another method of providing bus resiliency in such a system may include: discovering, by the DIMM bus adapter, a memory error in the DIMM; providing, by the DIMM bus adapter to the host memory controller, an indication of an error in a form not native to the bus protocol; discovering, by a driver, the indication of the error; and performing, by the driver, one or more resiliency measures responsive to the indication of the error.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
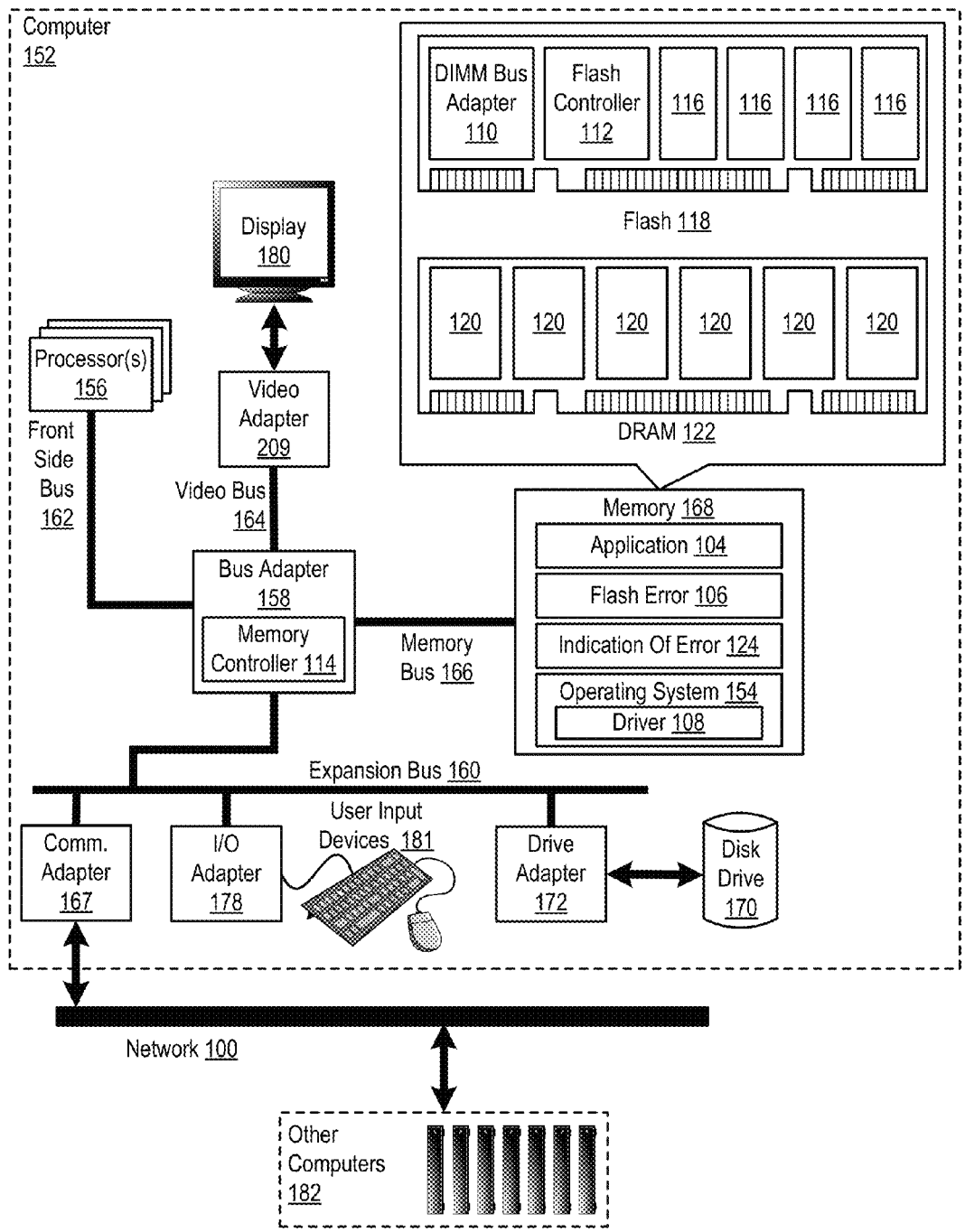
FIG. 1 sets forth a block diagram of a computer system configured for providing bus resiliency in a hybrid memory system according to embodiments of the present invention.

Exemplary methods, apparatus, and products for providing bus resiliency in a hybrid memory system in accordance with the present invention are described with reference to the accompanying drawings, beginning with FIG. 1. FIG. 1 sets forth a block diagram of a computer system configured for providing bus resiliency in a hybrid memory system according to embodiments of the present invention. The system of FIG. 1 includes an example of automated computing machinery in the form of an exemplary computer (152) useful in providing bus resiliency in a hybrid memory system according to embodiments of the present invention. The computer (152) of FIG. 1 includes at least one computer processor (156) or 'CPU' as well as memory (168) which is connected through a high speed memory bus (166) and bus adapter (158) to processor (156) and to other components of the computer (152).

In the example of FIG. 1, the memory (168) is a component of a hybrid memory system. The term 'hybrid' as used to describe a memory system refers to a system in which non-volatile memory is coupled to a bus designed for communications with volatile memory. In the example of FIG. 1, the hybrid memory system includes: a host memory controller (114), a non-volatile memory DIMM (Dual Inline Memory Module) in the form of Flash memory (118); and a memory bus (116) coupling the host memory controller (114) to the Flash DIMM (118). The Flash DIMM (118), through the use of the DIMM bus adapter (110) described below, and the DRAM DIMM (122) is configured to communicate with the host memory controller (114) over the memory bus (166) in accordance with a bus protocol. Examples of memory busses that may be utilized in accordance with embodiments of the present invention include DDR (Double Data Rate) busses, PCI busses, and PCIe busses, among others. In embodiments in which the memory bus is implemented as a PCIe bus, the bus protocol may be a PCIe bus protocol. Likewise, in embodiments in which the memory bus is implemented as a DDR bus, the bus protocol may be a DDR bus protocol.

The memory system also includes a DRAM DIMM (122). Although the host memory controller (114) in the example of FIG. 1 is implemented as a component of the bus adapter (158) readers of skill in the art will recognize that such a host memory controller (114), as well as functionality of the bus adapter (158), may be implemented as a component of the processor (156).

In the example of FIG. 1, the DRAM DIMM (122) includes a number of DRAM memory chips (120). The Flash DIMM (118) includes a number of Flash memory chips (116). The Flash DIMM (118) also includes a local memory controller in the form of a Flash controller (112). The Flash controller (112) is generally configured to receive memory access requests and perform memory accesses responsive to the commands.

The Flash controller (112) is not configured to communicate directly to the host memory controller (114) in accordance with the native bus protocol. To that end, the Flash DIMM (118) includes a DIMM bus adapter (110) which is configured to translate commands received from the memory controller (114) on the memory bus (166) in the native bus format into commands recognizable by the Flash controller (112) and vice versa.

The DIMM bus adapter (110) may also be configured to support native bus resiliency operations in the hybrid memory system according to embodiments of the present invention. To that end, the DIMM bus adapter (110) may be configured to operate in one of two modes. In a first mode, the DIMM bus adapter (110) provides bus resiliency by discovering a memory error (106) in the Flash DIMM (112) and providing an indication (124) of an error to the memory controller. The DIMM bus adapter may provide the indication (124) of the error by emulating a hardware error native to the bus protocol. Examples of Flash errors include Flash media errors, durability warnings, and the like. Examples of emulated errors include memory bus errors, ECC (Error Correction Code) mismatches, memory mirroring errors, and the like.

Responsive to the emulated hardware error, the host memory controller (114) may perform one or more resiliency measures responsive to the indication of the error. Such resiliency measure may include mirroring and sparing. Mirroring refers to utilizing one memory, sometimes on a different DIMM, to act as a current mirror of another memory. Such mirroring is administered throughout operation of the memory and may be initialized during startup as part of a POST (Power On Self Test) routine. In the example of FIG. 1, the mirroring may be enabled at POST such that data stored in memory of the Flash DIMM (118) is mirrored concurrently (or nearly so) in the DRAM DIMM (122). Then, responsive to an emulated hardware error received from the DIMM bus adapter of the Flash DIMM (118), the memory controller (114) may switch access to memory locations originally in the Flash DIMM (118) to the DRAM DIMM (122).

Sparing includes utilizing a secondary memory as a target to which data is copied, just prior to a failover from a primary memory source. In the example of FIG. 1, the memory controller (114) may perform sparing of the Flash DIMM (118) by copying data stored in memory of the Flash DIMM (118) to the DRAM DIMM (122) and the failing over to the DRAM DIMM (122) for future accesses of the memory locations storing that data.

It is noted that the host memory controller (114) may perform these resiliency measures without the need for software execution. In this way, the resiliency measures are performed efficiently without utilizing processor cycles and causing interruption of software execution by the processor.

In a second mode, the DIMM bus adapter (110) may also provide bus resiliency in the hybrid memory system of FIG. 1, but without emulating hardware errors native to the bus protocol. In this second mode, the DIMM bus adapter (110) may be configured to discover a memory error in the Flash DIMM (118) and provide an indication (124) of an error in a form not native to the bus protocol to the host memory controller. In this second mode, the error indication (124) is not formatted as a command or data communications recognizable by the memory controller (114). As such, the host memory controller (114) may be configured to raise an interrupt responsive to the indication (124) or store the indication (124) in a well known memory location.

To that end, a driver (108) for the Flash DIMM (118) may discover the indication of the error (either in servicing the interrupt or by periodically polling the well known memory location) and perform one or more resiliency measures responsive to the indication (124) of the error. In prior art, the driver (108) was configured to identify errors in Flash memory through out-of-band polling. By contrast, the driver (108) is effectively informed of the Flash error through in-band communications across the memory bus (166). Such communications are typically more efficient in terms of speed than out-of-band polling. Further, the driver (108) in the example of FIG. 1 is notified of the error in near-real time, rather than being forced to discover the error only during periodic polling instances.

Stored in memory (168) is an application (104), a module of computer program instructions for carrying out user-level data processing tasks. Also stored in memory (168) is an operating system (154). Operating systems useful providing bus resiliency in a hybrid memory system according to embodiments of the present invention include UNIX™, Linux™, Microsoft XP™, AIX™, IBM's i5/OS™, and others as will occur to those of skill in the art. The operating system (154) and application (104) in the example of FIG. 1 are shown in memory (168), but many components of such software typically are stored in other non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for providing bus resiliency in a hybrid memory system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for providing bus resiliency in a hybrid memory system according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
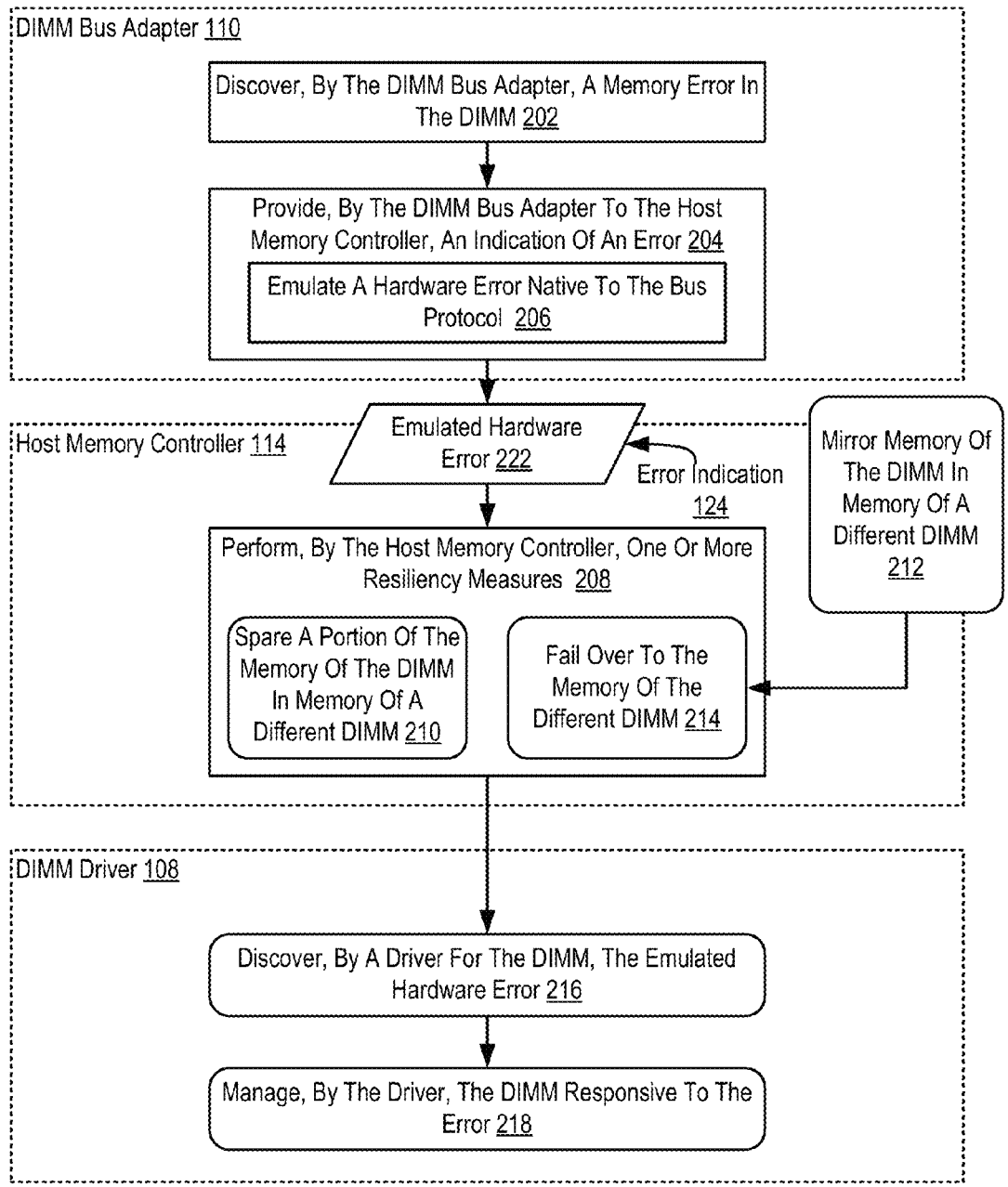
FIG. 2 sets forth a flow chart illustrating an exemplary method for providing bus resiliency in a hybrid memory system according to embodiments of the present invention.

For further explanation, FIG. 2 sets forth a flow chart illustrating an exemplary method for providing bus resiliency in a hybrid memory system according to embodiments of the present invention. The method of FIG. 2 may be carried out in a hybrid memory system similar to that depicted in the example of FIG. 1 that includes a host memory controller (114) and a non-volatile memory DIMM (118). The DIMM (118) may be coupled to the host memory controller (114) by a memory bus (166). The DIMM (118) may include non-volatile memory (116), a DIMM bus adapter (110), and a local memory controller (110). The local memory controller may be configured to control memory accesses within the DIMM (116) while the DIMM bus adapter (110) may be configured to adapt the local memory controller (112) to the bus (166) for memory communications with the host memory controller (114) in accordance with a bus protocol.

Providing bus resiliency may be carried out in the example method of FIG. 2 by discovering (202), by the DIMM bus adapter, a memory error in the DIMM. Discovering (202) a memory error in the DIMM may be carried out in various ways. In some embodiments, for example, the local memory controller of the DIMM may store indications of errors in local memory (such a register file or the like) designated for such purposes. In such embodiments, the DIMM bus adapter may periodically poll the local memory for the presence of such error indications or be informed via an interrupt when an error indication is stored in the local memory.

The method of FIG. 2 also includes providing (204), by the DIMM bus adapter (110) to the host memory controller (114), an indication (124) of an error. In the method of FIG. 2, providing (204) an indication (124) of an error may be carried out by emulating (206) a hardware error native to the bus protocol. The type of hardware error emulated by the DIMM bus adapter (110) may be dependent on the type of error discovered in the DIMM.

The method of FIG. 2 also includes performing (208), by the host memory controller (114), one or more resiliency measures responsive to the indication of the error. In the example of FIG. 2, performing (208) resiliency measures may be carried out in various ways. For example, performing (208) resiliency measures may be carried out by sparing (210) a portion of the non-volatile memory of the DIMM in memory of a different DIMM. In some embodiments, the hybrid memory system may also be configured for memory mirroring. In such embodiments, the method of FIG. 2 may include mirroring (212) memory of the DIMM in memory of a different DIMM and performing (208) the resiliency measures may include failing over (214) to the memory of the different DIMM.

The method of FIG. 2 also includes discovering (216), by a driver (108) for the DIMM, the emulated hardware error and managing (218), by the driver, the DIMM responsive to the error. The driver (108) may discover (216) the emulated hardware error in a variety of ways. The driver (108), for example, may be informed of the error by the host memory controller (114) through an interrupt, by discovering the error via polling of the non-volatile DIMM itself, or by discovering the bus resiliency measures performed from an operating system that stores such information. The driver (108), in such embodiments, effectively may take measures to correct or mitigate errors from the DIMM in addition to the bus resiliency errors provided by the host memory controller.

Figure 3:
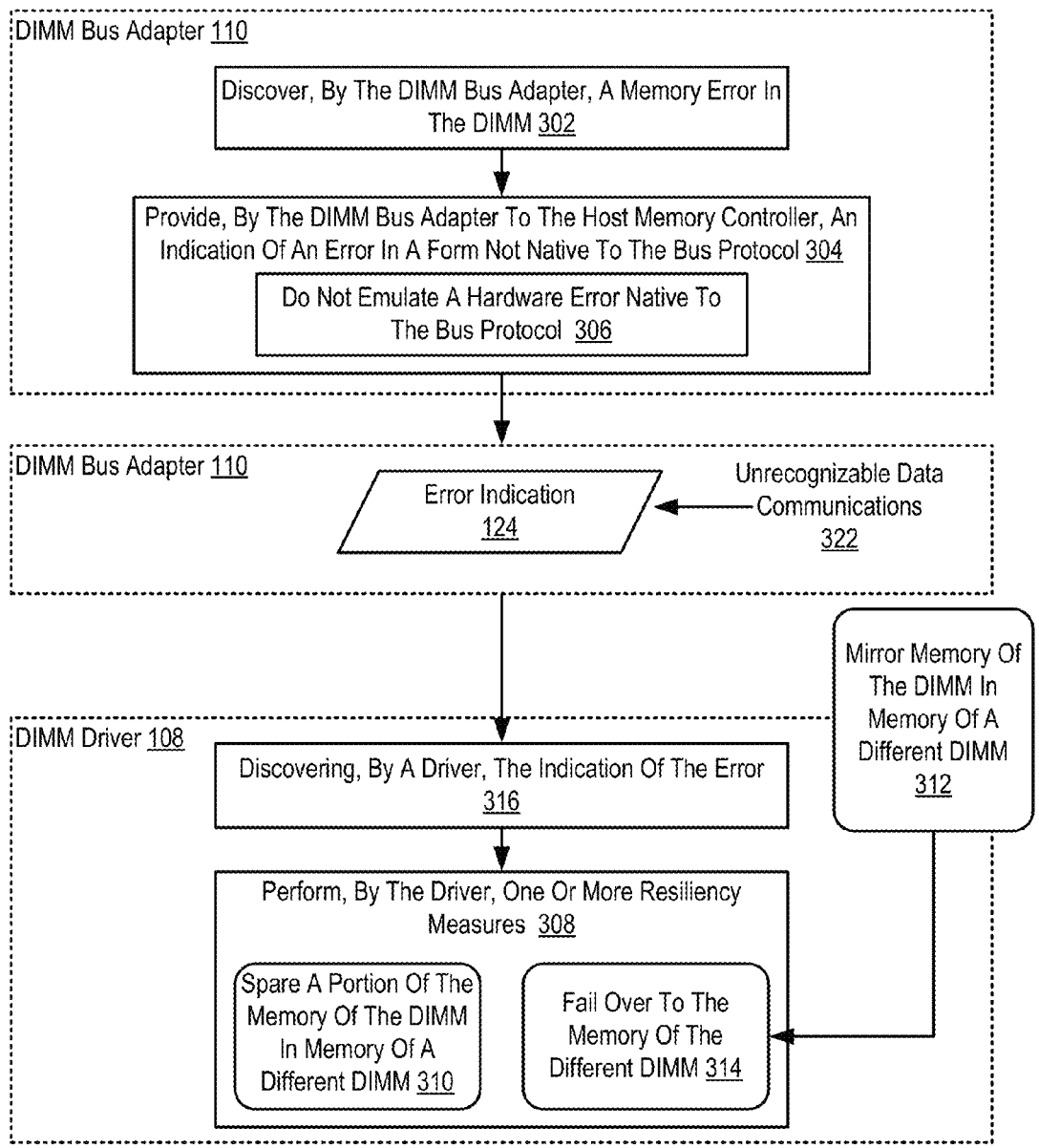
FIG. 3 sets forth a flow chart illustrating an exemplary method for providing bus resiliency in a hybrid memory system according to embodiments of the present invention.

For further explanation, FIG. 3 sets forth a flow chart illustrating another exemplary method for providing bus resiliency in a hybrid memory system according to embodiments of the present invention. The method of FIG. 3 may be carried out in a hybrid memory system similar to that depicted in the example of FIG. 1 that includes a host memory controller (114) and a non-volatile memory DIMM (118). The DIMM (118) may be coupled to the host memory controller (114) by a memory bus (166). The DIMM (118) may include non-volatile memory (116), a DIMM bus adapter (110), and a local memory controller (110). The local memory controller may be configured to control memory accesses within the DIMM (116) while the DIMM bus adapter (110) may be configured to adapt the local memory controller (112) to the bus (166) for memory communications with the host memory controller (114) in accordance with a bus protocol.

The method of FIG. 3 includes discovering (302), by the DIMM bus adapter (110), a memory error in the DIMM. Discovering (302) a memory error in the DIMM in the example of FIG. 3 may be carried out in a manner similar to that described above with respect to FIG. 2: the local memory controller of the DIMM may store indications of errors in local memory (such a register file or the like) designated for such purposes and the DIMM bus adapter may periodically poll the local memory for the presence of such error indications or be informed via an interrupt when an error indication is stored in the local memory.

The method of FIG. 3 also includes providing (304), by the DIMM bus adapter to the host memory controller, an indication of an error in a form not native to the bus protocol. In the method of FIG. 3, providing (304) an indication (124) of the error in a form not native to the bus protocol includes not emulating (306) a hardware error native to the bus protocol. Instead, the DIMM bus adapter (110) may provide the error indication (124) in data communications unrecognizable by the DIMM bus adapter (110).

The DIMM bus adapter (110) may store such data communications in a well known location, raise an interrupt to initiate servicing of the unrecognizable data communications (322), or otherwise inform a driver (108) for the DIMM of the error indication (124) without having any knowledge that the payload of the unrecognizable data communications (322) is an error indication. To that end, the method of FIG. 3 continues by discovering (316), by a driver (108), the indication (124) of the error (in servicing an interrupt raised by the host memory controller, by receiving a notification directly from the host memory controller, or by periodically polling the well known memory location in which the host memory controller stores such error indications in unrecognizable form).

The method of FIG. 3 also includes performing (308), by the driver, one or more resiliency measures responsive to the indication of the error. As in the method of FIG. 2, performing (308) one or more resiliency measures responsive to the indication of the error in the method of FIG. 3 may be carried out in a variety of ways. For example, performing (308) resiliency measures may be carried out by sparing (310) a portion of the non-volatile memory of the DIMM in memory of a different DIMM. In some embodiments, the hybrid memory system may also be configured for memory mirroring. In such embodiments, the method of FIG. 2 may include mirroring (312) memory of the DIMM in memory of a different DIMM and performing (308) the resiliency measures may include failing over (314) to the memory of the different DIMM.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A hybrid memory system for providing bus resiliency, the hybrid memory system comprising:
   a host memory controller;
   a non-volatile memory DIMM (Dual Inline Memory Module); and
   a memory bus coupling the host memory controller to the DIMM, wherein:
   the DIMM is coupled to the host memory controller and comprises non-volatile memory, a DIMM bus adapter, and a local memory controller;
   the local memory controller is configured to control memory accesses within the DIMM; and
   the DIMM bus adapter is configured to:
      adapt the local memory controller to the bus for memory communications with the host memory controller in accordance with a bus protocol;
      discover a memory error in the DIMM; and
      provide, to the host memory controller, an indication of an error by emulating a hardware error native to the bus protocol; and
   the host memory controller is further configured to perform one or more resiliency measures responsive to the indication of the error.

2. The hybrid memory system of claim 1 further comprising a driver for the DIMM configured to:
   discover the emulated hardware error; and
   manage the DIMM responsive to the error.

3. The hybrid memory system of claim 1, wherein resiliency measures include sparing a portion of the non-volatile memory of the DIMM in memory of a different DIMM.

4. The hybrid memory system of claim 1, wherein memory of the DIMM is mirrored in memory of a different DIMM and the resiliency measures include failing over to the memory of the different DIMM.

5. The hybrid memory system of claim 1, wherein the memory bus comprises a Peripheral Component Interconnect Express (PCIe) bus and the bus protocol comprises a PCIe bus protocol.

6. The hybrid memory system of claim 1, wherein the memory bus comprises a Double Data Rate (DDR) bus and the bus protocol comprises a DDR bus protocol.

7. A hybrid memory system for providing bus resiliency, the hybrid memory system comprising:
   a host memory controller;
   a non-volatile memory DIMM (Dual Inline Memory Module);
   a memory bus coupling the host memory controller to the DIMM; and
   a driver for the DIMM, wherein:
   the DIMM is coupled to the host memory controller and comprises non-volatile memory, a DIMM bus adapter, and a local memory controller;
   the local memory controller is configured to control memory accesses within the DIMM; and
   the DIMM bus adapter is configured to:
      adapt the local memory controller to the bus for memory communications with the host memory controller in accordance with a bus protocol;
      discover a memory error in the DIMM; and
      provide, to the host memory controller, an indication of an error without emulating a hardware error native to the bus protocol; and
   the driver is configured to discover the indication of the error and perform one or more resiliency measures responsive to the indication of the error.

8. The hybrid memory system of claim 7, wherein resiliency measures include sparing a portion of the non-volatile memory of the DIMM in memory of a different DIMM.

9. The hybrid memory system of claim 7, wherein the memory of the DIMM is mirrored in memory of a different DIMM and the resiliency measures include failing over to the memory of the different DIMM.

* * * * *